United States Patent
Eden

(10) Patent No.: US 10,116,686 B1
(45) Date of Patent: Oct. 30, 2018

(54) SYSTEMS AND METHODS FOR SELECTIVELY INSULATING A PROCESSOR

(71) Applicant: Gideon Eden, Lexington, MA (US)

(72) Inventor: Gideon Eden, Lexington, MA (US)

( * ) Notice: Subject to any disclaimer, the term of this patent is extended or adjusted under 35 U.S.C. 154(b) by 0 days.

(21) Appl. No.: 15/785,280

(22) Filed: Oct. 16, 2017

(51) Int. Cl.
*H04L 29/06* (2006.01)
*H04L 29/08* (2006.01)

(52) U.S. Cl.
CPC ...... *H04L 63/1441* (2013.01); *H04L 63/1416* (2013.01); *H04L 67/141* (2013.01); *H04L 67/143* (2013.01); *H04L 67/22* (2013.01)

(58) Field of Classification Search
CPC ... H04L 67/143; H04L 67/22; H04L 63/1416; H04L 63/1441
See application file for complete search history.

(56) References Cited

U.S. PATENT DOCUMENTS

| | | | | |
|---|---|---|---|---|
| 5,404,544 | A * | 4/1995 | Crayford | G06F 1/3215 713/310 |
| 5,987,611 | A | 11/1999 | Freund | |
| 8,200,818 | B2 | 6/2012 | Freund et al. | |
| 8,856,869 | B1 * | 10/2014 | Brinskelle | H04L 63/08 726/12 |
| 8,971,238 | B2 | 3/2015 | Wang et al. | |
| 2002/0171546 | A1 * | 11/2002 | Evans | G06F 21/554 340/540 |
| 2003/0074576 | A1 * | 4/2003 | Kelly | G06F 21/567 726/1 |
| 2003/0208606 | A1 * | 11/2003 | Maguire | G06F 21/554 709/227 |
| 2006/0282893 | A1 * | 12/2006 | Wu | H04L 63/1441 726/23 |
| 2007/0058667 | A1 | 3/2007 | Burton | |
| 2010/0235664 | A1 * | 9/2010 | Karlsson | G06F 1/3228 713/323 |
| 2010/0299720 | A1 | 11/2010 | John et al. | |
| 2013/0097701 | A1 * | 4/2013 | Moyle | G06F 21/552 726/22 |
| 2014/0125575 | A1 * | 5/2014 | Singhar | G06F 3/005 345/156 |
| 2015/0253838 | A1 * | 9/2015 | Amsterdam | G06F 1/3228 713/323 |
| 2015/0282077 | A1 * | 10/2015 | Yavuz | H04W 52/0212 455/452.1 |

(Continued)

OTHER PUBLICATIONS

Microsoft Community, "Windows 7 shuts off my network adapter when i the computer goes into sleep mode. Then takes forever to reconnect afterwards," see second post dated Dec. 3, 2009. (Year: 2009).*

*Primary Examiner* — Robert B Leung

(57) ABSTRACT

The disclosure includes a method for protecting a computer processor system from a harmful communication session from a network linked to the processor. The method can include disconnecting the processor from the network in response to a first event. The disconnecting step can disrupt the continuity of the harmful communication session from the network to the processor. The method can also include connecting the processor to the network in response to a second event. In some embodiments, the first and second events are controlled by the processor system independent from the contents of the data received from the network.

18 Claims, 3 Drawing Sheets

(56) References Cited

U.S. PATENT DOCUMENTS

2016/0099943 A1* 4/2016 Roberts ............... H04L 63/108
   726/3
2016/0309413 A1* 10/2016 De Sabatino ..... H04W 52/0229
2016/0315812 A1* 10/2016 Pinkerton ............ H04L 63/123
2016/0345063 A1* 11/2016 Cheng ................ H04N 21/4325

* cited by examiner

SYSTEMS AND METHODS FOR SELECTIVELY INSULATING A PROCESSOR

BACKGROUND

Field

The invention is directed in general to computer processing systems, and more specifically, to systems and methods for protecting computer-processing systems from cyber attacks.

Description of Related Art

Computer hacking is a serious threat to computers' security in the private and public sectors. Its consequences have been and will be a serious threat, which is increasing in time. It can damage financial institutions and government operations. No doubt that reducing hacking is a major challenge for the immediate and long-term future.

Due to the importance of this subject matter there is enormous number of devised systems in the prior art and the marketplace aimed at reducing such cyber threats. One example is the U.S. Pat. No. 9,712,558 that describes a system that determines whether the user is a legitimate human user or a cyber-attacker or automated script posing as the legitimate human user. Yet another system is described in U.S. Pat. No. 9,712,556, which demonstrates a security device in the local area network that intercepts a message from a first device in the local area network towards a second device in the local area network. The message requests connection between the first device and the second device. The security device prompts a user of the first device to approve the connection. In the event that the user approves the connection the first device is allowed to connect to the second device, and in the event that the user does not approve the connection the connection attempt is terminated. Yet another system and method is provided in U.S. Pat. No. 9,703,950 for implementing platform security on a consumer electronic device having an open development platform. The device is of the type, which includes an abstraction layer operable between device hardware and application software. A secured software agent is provided for embedding within the abstraction layer forming the operating system. The secured software agent is configured to limit access to the abstraction layer by either blocking loadable kernel modules from loading, blocking writing to the system call table or blocking requests to attach debug utilities to certified applications or kernel components.

The main problem with the systems described above is that they may be only useful to organizations, which can implement highly sophisticated systems supervised and maintained by their IT personnel. The implementation of these systems and their maintenance can also be quite costly. That leaves millions of individual individuals; operating their desktop computers, Laptop computers, tablet devices etc., (hereby defined as processors) without even a basic protection against cyber attacks. This invention will provide a method that can be easily employed to substantially reduce the exposure to cyber attacks and provide a layer of security with simple yet effective implementation.

SUMMARY

The present disclosure includes a method for protecting a computer processor system from a harmful communication session from a network linked to the processor, by interrupting the stream of damaging data from the network, wherein the processor system includes a processor. The method can include disconnecting the processor from the network in response to a first event, wherein disconnecting the processor disrupts the continuity of the harmful communication session from the network to the processor. The method can also include connecting the processor to the network in response to a second event, wherein the first event and the second event are controlled by the processor system independent from the contents of the data received from the network.

The first event can include no activity from a human operator interacting with the processor system for a predetermined amount of time. Also, the first event can include a user logging out of the processor system.

The second event can include a user logging into the processor system. Additionally, the first event can be caused by a human operator interacting with the processor system to thereby enable the disconnecting step, and the second event can be caused by the human operator interacting with the processor system to thereby enable the connecting step.

In some embodiments, the method includes an electronic module linking the network and the processor system. The electronic module can be arranged and configured to disconnect and connect the flow of data from the network to the processor system. The electronic module can be activated by one of the processor and a secondary processor.

Even still, the electronic module can connect and disconnect selective wires of at least one Ethernet communication cable along the path from the network to the processor. In some embodiments, the electronic module comprises one of an RF data bridge arranged and configured to disconnect and connect an RF data network line connected to the input of a network modem, and an optical data bridge arranged and configured to disconnect and connect an optical network line connected to the input of a network modem.

The Ethernet communication cable can link between network modules. The network module can be selected from a group consisting of a network modem directly linked to the processor, a network modem linked to a network router, a network server linked to a network modem, a network server linked to the processor, and any combination thereof.

In some embodiments, the method steps are implemented by one of a software module embedded in the processor, a software module embedded in a secondary processor, an electronic bridge linking the network to the processor, a mechanical bridge linking the network to the processor, an optical bridge linking the network to the processor and any combination thereof. The software module may directly disconnect and connect the flow of network data in the processor by disabling and enabling a network driver embedded in the processor. The network can be one of a local area network (LAN), a wide area network (WAN), the Internet, a computer server, and a group of servers forming a data cloud.

In some embodiments, the processor system includes the secondary processor. Accordingly, the steps of disconnecting and connecting may be controlled by the secondary computer processor. As well, the method steps may be implemented by a software module embedded in the secondary processor. The software module may disconnect and connect at least one of the processor and the secondary process from the network to thereby disable and enable flow of the network data in the processor system by disabling and enabling a network driver embedded in the processor system.

The software module may enable an operator to perform at least one of disconnecting and connecting the processor to the network in near real-time. Furthermore, the disconnecting and connecting steps may be performed in response to the software module receiving a command from the operator. The software module may be arranged and configured to automatically disconnect the processor from the network after a predetermined time in which an operator has stopped interacting with the processor.

In some embodiments, the software module is arranged and configured to automatically disconnect the processor from the network whenever an operator terminates activity by logging off the processor. The software module may also be arranged and configured to automatically disconnect from the network whenever an operator terminates activity by logging off the secondary processor.

The disclosure also includes a method for protecting a computer processor system from a harmful communication session from a network linked to the processor, by interrupting the stream of damaging data from the network, wherein the processor system includes a processor. The method can include disconnecting the processor from the network after a first amount of time has elapsed, wherein disconnecting the processor disrupts the continuity of the harmful communication session from the network to the processor. The method can also include connecting the processor to the network after a second amount of time has elapsed, wherein the first event and second event are controlled by the processor system independent from the contents of the data received from the network.

In some embodiments, the first amount of time defines at least one of a first predetermined amount of time and a first random amount of time, and the second amount of time defines at least one of a second predetermined amount of time and a second random amount of time. In some embodiments, the first amount of time defines the first predetermined amount of time, and the second amount of time defines the second predetermined amount of time. Additionally, in some embodiments, the first amount of time defines the first random amount of time, and the second amount of time defines the second random amount of time. Even still, in some embodiments, the first amount of time does not equal the second amount of time. However, in some embodiments, the first amount of time equals the second amount of time.

In some embodiments, disconnecting the processor from the network occurs in response to the processor system determining a harmful communication session from the network to the processor. As well, connecting the processor to the network may occur in response to the processor system determining the safe communication session from the network to the processor The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments. The above and other features of the present invention will become more apparent by describing in detail exemplary embodiments thereof with reference to the accompanying drawings, in which.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Systems Embodiments

In essence this invention is a method for selectively insulating a processor from a network, comprising steps of disconnecting and connecting the processor from and to the network at specific instances in a manner that can disrupt the continuity of harmful attempts of communications from the network to the processor. In other words direct cyber attacks cannot take place if a processor is not communicating with a network. It is expected that as time goes by more direct cyber attacks will take place, and that minimization of exposure of the processor to the network will significantly reduce the success rate of these attacks.

Figure 1:
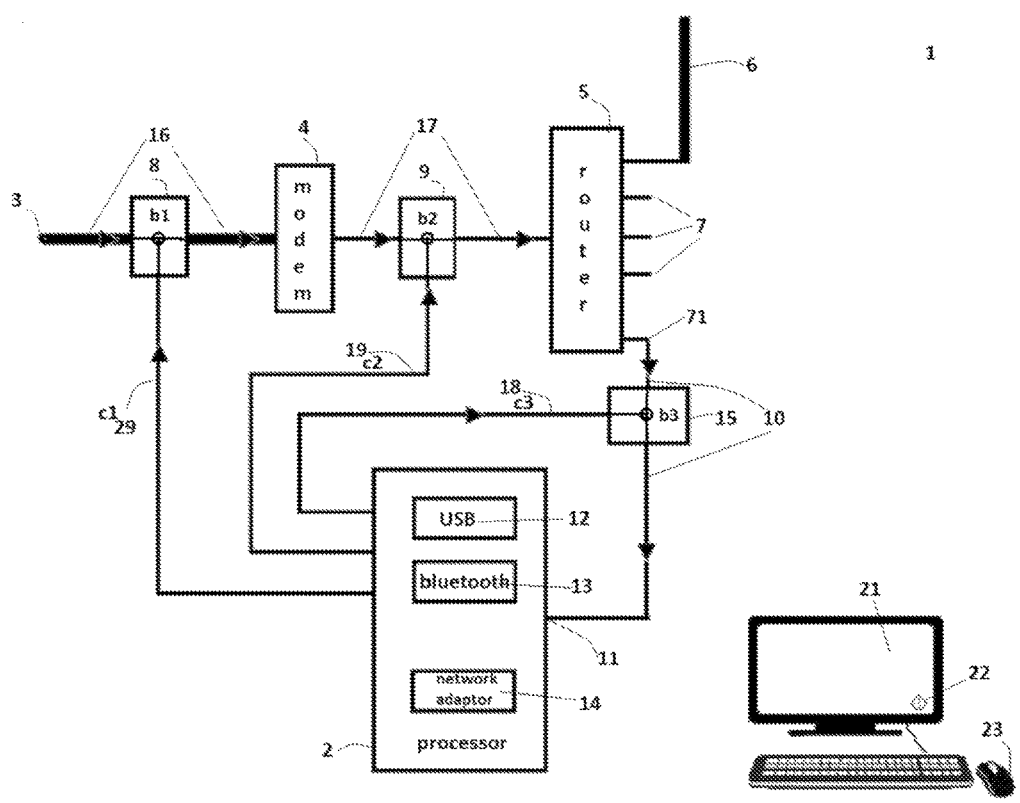
FIG. 1 illustrates a processor system, according to some embodiments.

FIG. 1 illustrates several embodiments of the invention by showing dedicated devices that collectively apply the general method. The processor 2 is connected to a network via the network input 3. The processor may be a desktop personal computer, a minicomputer, a mainframe, a computer server, a laptop computer, a notebook or a smart phone capable of communicating to the network either through wiring or wireless protocols. In the illustration the processor 2 is a desktop computer incorporating Ethernet data communication input 11 and/or a Wi-Fi adaptor 14 receiving network data wirelessly from a network router 5 via a Wi-Fi antenna 6. The network may be a local area network (LAN), a wide area network (WAN), a server line including any cluster (cloud) of servers, or the Internet. The various embodiments differ from each other by the application of one or combination of the bridges 8 (B1), 9 (B2) and 15 (B3). The processor 2 also incorporates direct control lines modules 12 such as serial RS232 or USB control, and/or wireless control 14 such as a blue tooth communications.

The wire or wireless controls 18, 19 and 29 can connect and disconnect the bridges 15, 9 and 8 respectively by software modules embedded in the processor 2.

In one of the embodiments the processor 2 is a desktop computer with Ethernet input 11 linking the computer to the network 3 that may be the Internet. In this configuration the bridge 2 (B1) is closed allowing network data to permanently flow via the cable 16 to a network modem 4. The network cable 16 can be either an optical cable or COAX cable carrying RF information. The modem 4 is connected via an Ethernet cable 17 to a network router 5. Here again in this embodiment the bridge 9 is permanently closed. The network data flows from the router via the output line Ethernet 71. The Ethernet bridge 15 (B3) connects and disconnects the 10 under the control line 18 (C3), thereby enabling or disabling the flow of data from the modem line 71 to the network processor input 11. The Command line 18 is either a wired or wireless line activated by the software module in the processor. As a wired control line it can be a serial communication cable such as RS232 or USB line controlled by the processor's module 12. As a wireless command line it can be a Bluetooth activated by the Bluetooth module 13 in the processor. The processor may have a display 21 and a mouse 23 to provide the operator with control over the network flow of data, and may have the following features:

a) The operator can manually enable or disable the bridge 12 by clicking a "button" 22 presented on the 21 with the mouse 23. Usually the operator will disable the flow of data when the Internet is not used, either for emails or streaming data. It can be shortly activated to load emails or other data from the Internet. The software module activates or deactivates the control line 18 by wire control or wireless control as discussed above.

b) The bridge 15 is deactivated automatically whenever the operator logs off the operating system of the processor 2. The same scheme can be applied when the operating system goes to sleeping or hibernating modes. When logging back in the software may provide the operator with the choice either to reactivate the bridge 15 or to keep it deactivated.

c) The bridge 15 is deactivated after predetermined amount of time in which the operator does not interact with the processor. For example it is deactivated if the mouse is not used to move the display cursor for the predetermined time. This is a powerful feature that relieves the operator from remembering to deactivate the network when the processor is not attended. The operator though may reactivate it at any time buy clicking on the "button" described above.

d) The bridge 15 is activated and deactivated at random times, inhibiting or reducing longer exposure of harmful communications from the network. This can also be a powerful option to be applied whenever the processor is not attended.

Another embodiment of the method employs the bridge 9 (B2), linking the modem 4 to the router 5. The main advantage of this method that it can deactivates simultaneously several processors, each linked to one of the output lines 7 of the router 5. Moreover any processor linked via Wi-Fi to the Router antenna 6 will be controlled as well. These processors can be also tablet and smart phones.

Yet another embodiment, more suitable to business networks, is accomplished by deactivating bridge 8 (B1) that totally disconnects any communications from the network to the operator's facility including data communicated to local servers. In that case the bridge 8 is linking either RF (coax) cables or optical (fiber optic) cables.

Method Embodiments

Figure 2:
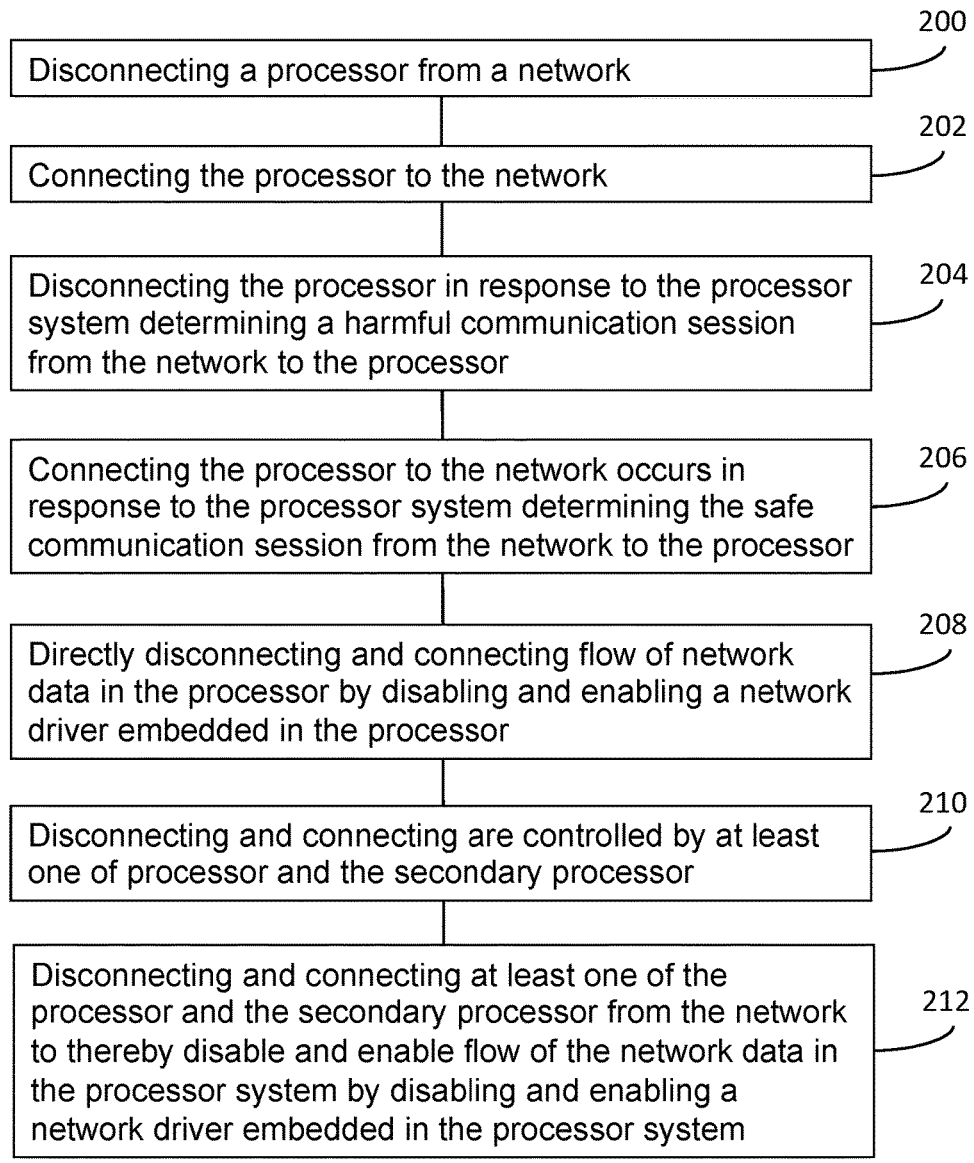
FIG. 2 illustrates a flow diagram showing methods of operating a processor system, according to some embodiments.
Figure 3:
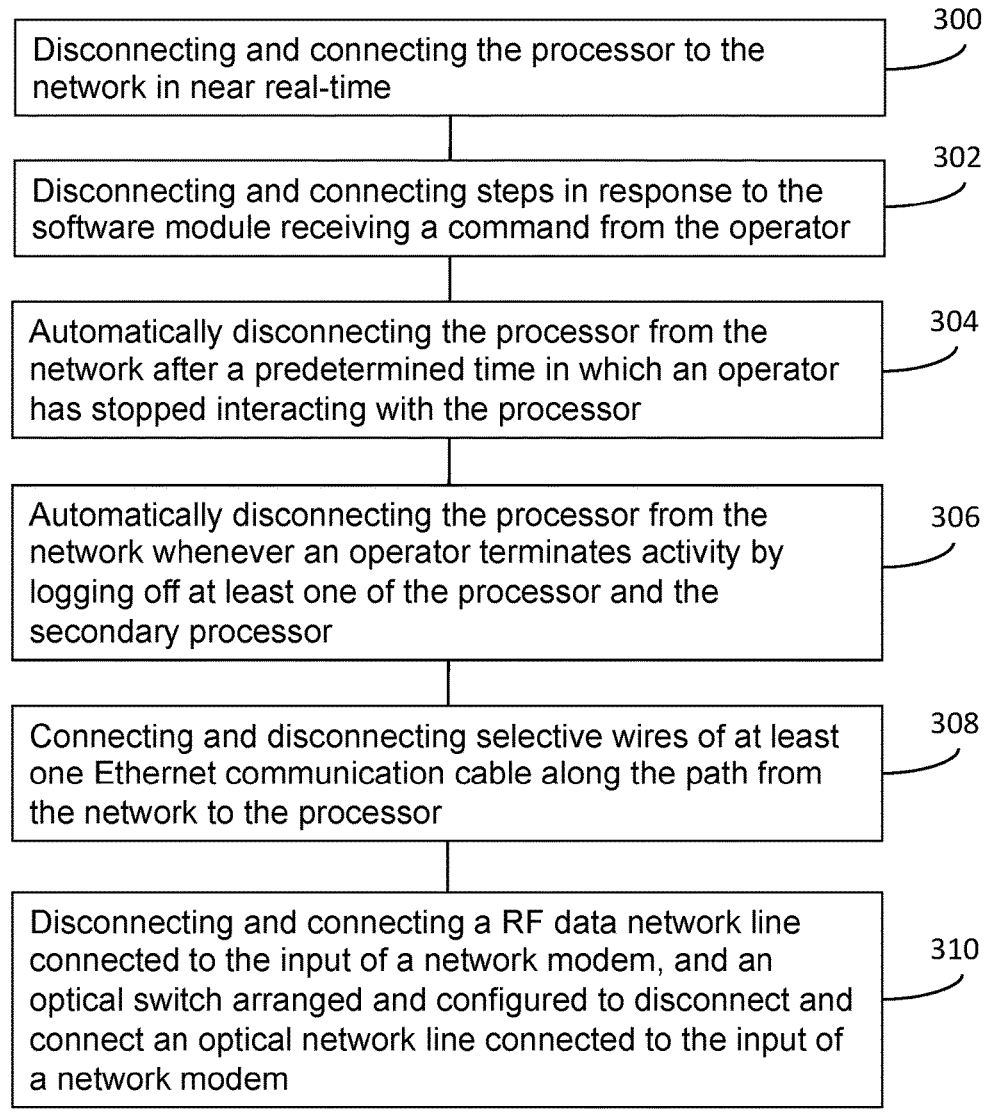
FIG. 3 illustrates a flow diagram showing methods of operating a processor system, according to some embodiments.

As shown in FIG. 2, the disclosure includes a method for selectively insulating a computer processor system from a communication network. The method may include disconnecting the processor from the network (at step 200) and connecting the processor to the network (at step 202).

In some embodiments, disconnecting the processor from the network occurs in response to the processor system determining a harmful communication session from the network to the processor (at step 204). Additionally, connecting the processor to the network occurs in response to the processor system determining the safe communication session from the network to the processor (at step 206). It should be appreciated that the method steps may be implemented by a software module embedded in the processor.

Even still, in some embodiments, the software module directly disconnects and connects flow of network data in the processor by disabling and enabling a network driver embedded in the processor (at step 208). In some embodiments that include a secondary processor, the steps of disconnecting and connecting may be controlled by the secondary computer processor (at step 210). Additionally, the method steps may be implemented by a software module embedded in the secondary processor.

In some embodiments, disconnecting and connecting at least one of the processor and the secondary processor from the network disables and enables flow of the network data in the processor system by disabling and enabling a network driver embedded in the processor system (at step 212).

The software module may enable an operator to perform at least one of disconnecting and connecting the processor to the network in near real-time (at step 300). Additionally, the disconnecting and connecting steps may be performed in response to the software module receiving a command from the operator (at step 302).

The software module may be arranged and configured to automatically disconnect the processor from the network after a predetermined time in which an operator has stopped interacting with the processor (at step 304). Furthermore, the software module may be arranged and configured to automatically disconnect the processor from the network whenever an operator terminates activity by logging off at least one of the processor and the secondary processor (at step 306).

In some embodiments, the at least one bridge connects and disconnects selective wires of at least one Ethernet communication cable along the path from the network to the processor (at step 308). Additionally, the bridge may comprise an RF bridge arranged and configured to disconnect and connect an RF data network line connected to the input of a network modem, and an optical bridge arranged and configured to disconnect and connect an optical network line connected to the input of a network modem (at step 310).

Interpretation

The term "insulating" can be interpreted to mean protecting a piece of equipment, such as a computer processor. It should be appreciated that the terms "processor" and "processor system" may include any type of computer processor, mobile device processor, computer processing unit, any part of a computer in which operations are controlled and executed, and the like.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method for protecting a computer processor system from a harmful communication session from a network linked to the processor system, by interrupting a stream of damaging data from the network, wherein the processor system includes a processor, the method comprising:
   disconnecting the processor from the network in response to a first event, wherein disconnecting the processor disrupts the continuity of the harmful communication session from the network to the processor, wherein the first event comprises no activity from a human operator interacting with the processor system for a random amount of time and the first event occurs independently of any data available to the processor system; and
   resuming communication to the network by connecting the processor to the network in response to a second event, wherein both the first event and the second event are controlled by the processor system independent from the contents of the data received from the network.

2. The method of claim 1, wherein the second event comprises a user logging into the processor system.

3. The method of claim 1, wherein the second event is caused by the human operator interacting with the processor system to thereby enable the connecting step.

4. The method of claim 1, comprising an electronic module linking the network and the processor system, wherein the electronic module is arranged and configured to disconnect and connect the flow of data from the network to the processor system, wherein the electronic module is activated by one of the processor and a secondary processor.

5. The method of claim 4, wherein the electronic module connects and disconnects selective wires of at least one Ethernet communication cable along the path from the network to the processor.

6. The method of claim 5, wherein the Ethernet communication cable links between network modules selected from a group consisting of a network modem directly linked to the processor, a network modem linked to a network router, a network server linked to a network modem, a network server linked to the processor, and any combination thereof.

7. The method of claim 4, wherein the electronic module comprises one of an RF data bridge arranged and configured to disconnect and connect an RF data network line connected to the input of a network modem, and an optical data bridge arranged and configured to disconnect and connect an optical network line connected to the input of a network modem.

8. The method of claim 1, wherein the method steps are implemented by one of a software module embedded in the processor, a software module embedded in a secondary processor, an electronic bridge linking the network to the processor, a mechanical bridge linking the network to the processor, an optical bridge linking the network to the processor and any combination thereof.

9. The method of claim 1, wherein the network is one of a local area network (LAN), a wide area network (WAN), the Internet, a computer server, and a group of servers forming a data cloud.

10. A method for protecting a computer processor system from a harmful communication session from a network linked to the processor system, by interrupting a stream of damaging data from the network, wherein the processor system includes a processor, the method comprising:

disconnecting the processor from the network in response to a first authorized user logging out of the processor system, wherein disconnecting the processor disrupts the continuity of the harmful communication session from the network to the processor; and resuming communication to the network by connecting the processor to the network in response to a second authorized user logging into the processor system; and disconnecting the processor from the network in response to a first event that comprises no activity from a human operator interacting with the processor system for a random amount of time.

11. The method of claim 1, wherein the first event is initiated by the processor system performing one of hibernating and sleeping.

12. The method of claim 10, further comprising disconnecting the processor from the network after a first amount of time has elapsed.

13. The method of claim 12, further comprising resuming communication to the network by connecting the processor to the network after a second amount of time has elapsed.

14. The method of claim 13, wherein the first amount of time defines at least one of a first predetermined amount of time and a first random amount of time, and the second amount of time defines at least one of a second predetermined amount of time and a second random amount of time.

15. The method of claim 14, wherein the first amount of time defines the first predetermined amount of time, and the second amount of time defines the second predetermined amount of time.

16. The method of claim 14, wherein the first amount of time defines the first random amount of time, and the second amount of time defines the second random amount of time.

17. The method of claim 13, wherein the first amount of time does not equal the second amount of time.

18. The method of claim 13, wherein the first amount of time equals the second amount of time.

* * * * *